US012579789B2

(12) United States Patent
Kim et al.

(10) Patent No.: US 12,579,789 B2
(45) Date of Patent: Mar. 17, 2026

(54) METHOD AND APPARATUS FOR GENERATING AND PROVIDING DATA VIDEO FOR GENERATING TRAINING DATA OF ARTIFICIAL INTELLIGENCE MODEL AND RECORDING MEDIUM ON WHICH PROGRAM FOR THE SAME IS RECORDED

(71) Applicant: RideFlux Inc., Jeju-si (KR)

(72) Inventors: Hee Kon Kim, Jeju-si (KR); Hawook Jeong, Jeju-si (KR)

(73) Assignee: RideFlux Inc., Jeju-si (KR)

( * ) Notice: Subject to any disclaimer, the term of this patent is extended or adjusted under 35 U.S.C. 154(b) by 509 days.

(21) Appl. No.: 18/148,800

(22) Filed: Dec. 30, 2022

(65) Prior Publication Data

US 2023/0215146 A1     Jul. 6, 2023

(30) Foreign Application Priority Data

Jan. 3, 2022     (KR) ........................ 10-2022-0000147

(51) Int. Cl.
*G06V 10/75*      (2022.01)
*G06V 10/774*     (2022.01)
*G06V 20/70*      (2022.01)

(52) U.S. Cl.
CPC .......... *G06V 10/774* (2022.01); *G06V 10/751* (2022.01); *G06V 20/70* (2022.01)

(58) Field of Classification Search
CPC .... G06V 10/774; G06V 10/751; G06V 20/70; G06V 20/64; G06V 10/772; G06V 20/58; G06V 20/56
See application file for complete search history.

(56) References Cited

U.S. PATENT DOCUMENTS

| | | | |
|---|---|---|---|
| 11,636,602 B1* | 4/2023 | Havír ................... | G06V 10/774 |
| | | | 382/164 |
| 2019/0034312 A1* | 1/2019 | Karunamoorthy ..... | G06V 20/48 |
| 2019/0228262 A1* | 7/2019 | Gonzalez ............... | A63F 13/65 |
| 2022/0027675 A1* | 1/2022 | Sheu ..................... | G01S 17/931 |
| 2022/0092291 A1* | 3/2022 | Lai ........................... | G01S 17/42 |
| 2022/0277193 A1* | 9/2022 | Wekel ..................... | G06T 19/00 |

FOREIGN PATENT DOCUMENTS

| | | |
|---|---|---|
| KR | 10-2322644 B1 | 11/2021 |
| KR | 10-2022-0049857 A | 4/2022 |

* cited by examiner

*Primary Examiner* — Han Hoang
(74) *Attorney, Agent, or Firm* — Studebaker Brackett PLLC

(57)          ABSTRACT

Provided are a method and apparatus for generating and providing a data video for generating training data of an artificial intelligence model and a recording medium on which a program for the same is recorded. According to various embodiments of the present disclosure, a method includes generating light detection and ranging (LiDAR) images using LiDAR point cloud data for a predetermined area, generating a LiDAR video using each of the LiDAR images as a unit frame, and providing a user interface (UI) that outputs the generated LiDAR video, when a unit frame change request is acquired from a user, comparing a first unit frame currently being output with a second unit frame after the first unit frame to detect at least one pixel whose attribute changes, and updating only the one or more detected pixels in the first unit frame using the second unit frame.

13 Claims, 7 Drawing Sheets

S120

PERFORM LABELING ON FIRST OBJECT INCLUDED IN FIRST UNIT FRAME — S310

CORRECT LOCATION OF FIRST OBJECT — S320

CALCULATE CONCORDANCE RATE BETWEEN PLURALITY OF SECOND OBJECTS INCLUDED IN SECOND UNIT FRAME AND FIRST OBJECT WHOSE LOCATION IS CORRECTED — S330

SELECT ANY ONE OF PLURALITY OF SECOND OBJECTS — S340

PERFORM LABELING ON SECOND OBJECT — S350

END

METHOD AND APPARATUS FOR GENERATING AND PROVIDING DATA VIDEO FOR GENERATING TRAINING DATA OF ARTIFICIAL INTELLIGENCE MODEL AND RECORDING MEDIUM ON WHICH PROGRAM FOR THE SAME IS RECORDED

CROSS-REFERENCE TO RELATED APPLICATION

This application claims priority to and the benefit of Korean Patent Application No. 10-2022-0000147, filed on Jan. 3, 2022, the disclosure of which is incorporated herein by reference in its entirety.

BACKGROUND

1. Field of the Invention

Various embodiments of the present invention relate to a method and apparatus for generating and providing a data video for generating training data of an artificial intelligence model and a recording medium on which a program for the same is recorded.

2. Discussion of Related Art

For the convenience of users driving vehicles, various sensors and electronic apparatuses (e.g., an advanced driver assistance system (ADAS)) are being provided, and in particular, technological development of autonomous driving systems of vehicles is actively being conducted.

Here, in an autonomous driving system, a vehicle recognizes its surrounding environment without driver intervention and automatically drives to a given destination according to the recognized surrounding environment.

In general, an autonomous driving system trains a model using autonomous driving data (e.g., data on road conditions, driving routes, or the like) as training data, and provides a driving route that a vehicle may drive to a destination using the trained model.

In order to supervise the model using the autonomous driving data as the training data, numerous types of sensor data (e.g., laser scan data acquired from a laser scan sensor and image (video or image) data detected through a camera sensor) and ground truth indicating a location of a vehicle in the sensor data are required. Therefore, the autonomous driving data needs to be labeled in order to provide the ground truth on each type of sensor data.

Meanwhile, in the related art, since a person should directly label each piece of sensor data in order to label the autonomous driving data, there is a problem in that much time is required for labeling. In addition, since more manpower should be put in to shorten the time, there is a problem that more costs such as labor costs are required.

In addition, in the case of the conventional method, since points of a light detection and ranging (LiDAR) point cloud are drawn one by one and graphed, there is a problem in that it is difficult to process an operation quickly because it takes a long time to load data compared to the number of points, and a problem in that it is difficult to clearly determine whether a specific object is a dynamic object (e.g., a person) or a static object (e.g., a pillar) using only one point cloud when a person directly performs labeling.

SUMMARY OF THE INVENTION

The present invention is directed to providing a method and apparatus for generating and providing a data video for generating training data of an artificial intelligence model that provides a user interface (UI) through which a labeling operation is performed and performs labeling on a plurality of pieces of sensor data by inputting a simple input (e.g., labeling target selection) to two-dimensional (2D)-type data output through the UI, and a recording medium on which a program for the same is recorded.

In addition, the present invention is directed to providing a method and apparatus for generating and providing a data video for generating training data of an artificial intelligence model that generate a light detection and ranging (LiDAR) image and a LiDAR video using a plurality of pieces of LiDAR point cloud data and perform labeling on a labeling target through the generated LiDAR image and LiDAR video to perform the labeling while quickly watching the video just like when the video is played, and label the LiDAR images back and forth according to time series as in the video to clearly determine attributes of objects that are difficult to clearly determine with only one image, and a recording medium on which a program for the same is recorded.

Objects of the present invention are not limited to the objects described above, and other objects that are not mentioned may be obviously understood by those skilled in the art from the following description.

According to an aspect of the present invention, there is provided a method of generating and providing a data video for generating training data of an artificial intelligence model performed by a computing apparatus, the method including generating a plurality of LiDAR images using a plurality of pieces of LiDAR point cloud data for a predetermined area, generating a LiDAR video using each of the plurality of generated LiDAR images as a unit frame, and providing a UI that outputs the generated LiDAR video, in which the providing of the UI includes sequentially outputting a plurality of unit frames included in the generated LiDAR video according to time series, when a unit frame change request is acquired from a user, comparing a first unit frame currently being output with a second unit frame after the first unit frame to detect at least one pixel whose attribute changes, and updating only the one or more detected pixels in the first unit frame using the second unit frame.

The generating of the plurality of LiDAR images may include generating a first LiDAR image by quantizing three-dimensional (3D) first LiDAR point cloud data on a two-dimensional (2D) grid map, the generated first LiDAR image including a plurality of pixels, and attributes of each of the plurality of pixels are determined based on values of points included in each of the plurality of pixels and when a plurality of points are included in one pixel, determining an attribute of the one pixel based on representative values of the plurality of points.

The generating of the LiDAR video may include generating the LiDAR video by sequentially coupling the generated LiDAR images according to the time series using each of the generated LiDAR images as the unit frame, and when a similarity between a first unit frame and a second unit frame adjacent to each other among the plurality of unit frames included in the generated LiDAR video is greater than or equal to a preset reference value, deleting any one of the first unit frame and the second unit frame within the generated LiDAR video.

The UI may include a first area that sequentially outputs a plurality of unit frames included in the generated LiDAR video according to the time series and a second area that outputs sensor data pre-matched with any one unit frame output to the first area among the plurality of unit frames, and the providing of the UI may include, when the user positions a pointer for a user input at one point on any one unit frame output to the first area, selecting one point of sensor data pre-matched with the one point on the any one unit frame, changing an attribute of the one point of the selected sensor data, and outputting the changed attribute through the second area.

The providing of the UI may include performing labeling on the labeling target on the generated LiDAR video in response to acquiring a user input for selecting a labeling target through the generated LiDAR video, and the performing of the labeling may include, when a user input for selecting a specific object is acquired through any one of a plurality of unit frames included in the generated LiDAR video, selecting a unit frame including the same object as the selected specific object from the plurality of unit frames and performing labeling on the specific object in the selected unit frame.

The performing of the labeling on the specific object may include, upon acquiring a request to perform the labeling on a first object included in a first unit frame that is a LiDAR image generated using LiDAR point cloud data collected at a first point in time, performing the labeling on the first object, correcting a location of the first object based on a second point in time; calculating a concordance rate between a plurality of second objects included in a second unit frame after the first unit frame and the first object whose location is corrected, the second unit frame being a LiDAR image generated using LiDAR point cloud data collected at the second point in time, and selecting any one second object determined to be the same object as the first object among the plurality of second objects based on the calculated concordance rate, and performing the labeling on the selected second object.

The performing of the labeling on the selected second object may include selecting a second object having a highest concordance rate with the first object whose location is corrected among the plurality of second objects, performing the labeling on the selected second object, when a difference in a concordance rate between the second object having the highest concordance rate with the first object whose location is corrected and a second object having a second highest concordance rate is less than or equal to a preset value, comparing first sensor data pre-matched with the first unit frame with second sensor data pre-matched with the second unit frame to select any one of the second object having the highest concordance rate with the first object whose location is corrected and the second object having the second highest concordance rate.

The generating of the plurality of LiDAR images may include matching a coordinate value of first LiDAR point cloud data for the predetermined area with a coordinate value of one or more pieces of sensor data collected at the same point in time as the first LiDAR point cloud data and matching a coordinate value of a first LiDAR image generated using the first LiDAR point cloud data with the coordinate value of the first LiDAR point cloud data, and the performing of the labeling may include, upon acquiring a user input for selecting a first object through the first LiDAR image, performing the labeling on the first object on the first LiDAR image, performing the labeling on the first object on the first LiDAR point cloud data using the coordinate value of the first LiDAR point cloud data matched with the coordinate value of the first LiDAR image of the first object, and performing the labeling on the first object on the one or more pieces of first sensor data using the coordinate value of the one or more pieces of first sensor data matched with the coordinate value of the first LiDAR image.

The performing of the labeling includes: when a user input for selecting the labeling target is acquired through any one of the plurality of unit frames through the UI, generating a first bounding box for labeling the labeling target at a location at which the user input is acquired; and generating a second bounding box on sensor data pre-matched with any one of the unit frames using the generated first bounding box.

The generating of the second bounding box may include, when the pre-matched sensor data is 3D data, calculating a bottom surface and a height of the labeling target using height information of at least one point inside the first bounding box, and generating a second bounding box in the form of a 3D figure using the calculated bottom surface and height of the labeling target, and when the pre-matched sensor data is 2D data, converting a coordinate value of the second bounding box in the form of the 3D figure into an image coordinate system to generate a second bounding box in the form of a 2D figure.

The generating of the second bounding box may include, upon acquiring an attribute change request for the generated first bounding box, changing an attribute of the generated first bounding box based on the acquired attribute change request, and automatically changing an attribute of the generated second bounding box according to the change in the attribute of the generated first bounding box in response to the change in the attribute of the generated first bounding box.

The generating of the first bounding box may include generating the first bounding box for labeling the specific object in response to acquiring the user input for selecting the specific object, and when the generated first bounding box at least partially overlaps the previously generated first bounding box, maintaining the generated first bounding box and deleting the previously generated first bounding box.

The generating of the first bounding box may include outputting any one of a plurality of first bounding box templates of different shapes preset according to the user input to the UI and determining the type of labeling target according to a shape of any one of the output templates.

According to another aspect of the present invention, there is provided an apparatus for generating and providing a data video for generating training data of an artificial intelligence model, the apparatus including a processor, a network interface, a memory, and a computer program loaded into the memory and executed by the processor, in which the computer program includes an instruction for generating a plurality of LiDAR images using a plurality of LiDAR point cloud data for a predetermined area, an instruction for generating a LiDAR video using each of the plurality of generated LiDAR images as a unit frame, and an instruction for providing a UI that outputs the generated LiDAR video, and the instruction for providing the UI includes an instruction for sequentially outputting a plurality of unit frames included in the generated LiDAR video according to time series, when a unit frame change request is acquired from a user, an instruction for comparing a first unit frame currently being output with a second unit frame after the first unit frame to detect a pixel whose attribute changes, and an instruction for updating only the detected pixel in the first unit frame to a pixel of the second unit frame.

According to still another aspect of the present invention, there is provided a recording medium coupled with and readable by a computing apparatus on which program for executing a method of generating and providing a data video for generating training data of an artificial intelligence model is recorded, in which the method includes generating a plurality of LiDAR images using a plurality of pieces of LiDAR point cloud data for a predetermined area; generating a LiDAR video using each of the plurality of generated LiDAR images as a unit frame, and providing a UI that outputs the generated LiDAR video, and the providing of the UI includes sequentially outputting a plurality of unit frames included in the generated LiDAR video according to time series, when a unit frame change request is acquired from a user, comparing a first unit frame currently being output with a second unit frame after the first unit frame to detect a pixel whose attribute changes, and updating only the detected pixel in the first unit frame to a pixel of the second unit frame.

Other specific details of the invention are contained in the detailed description and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
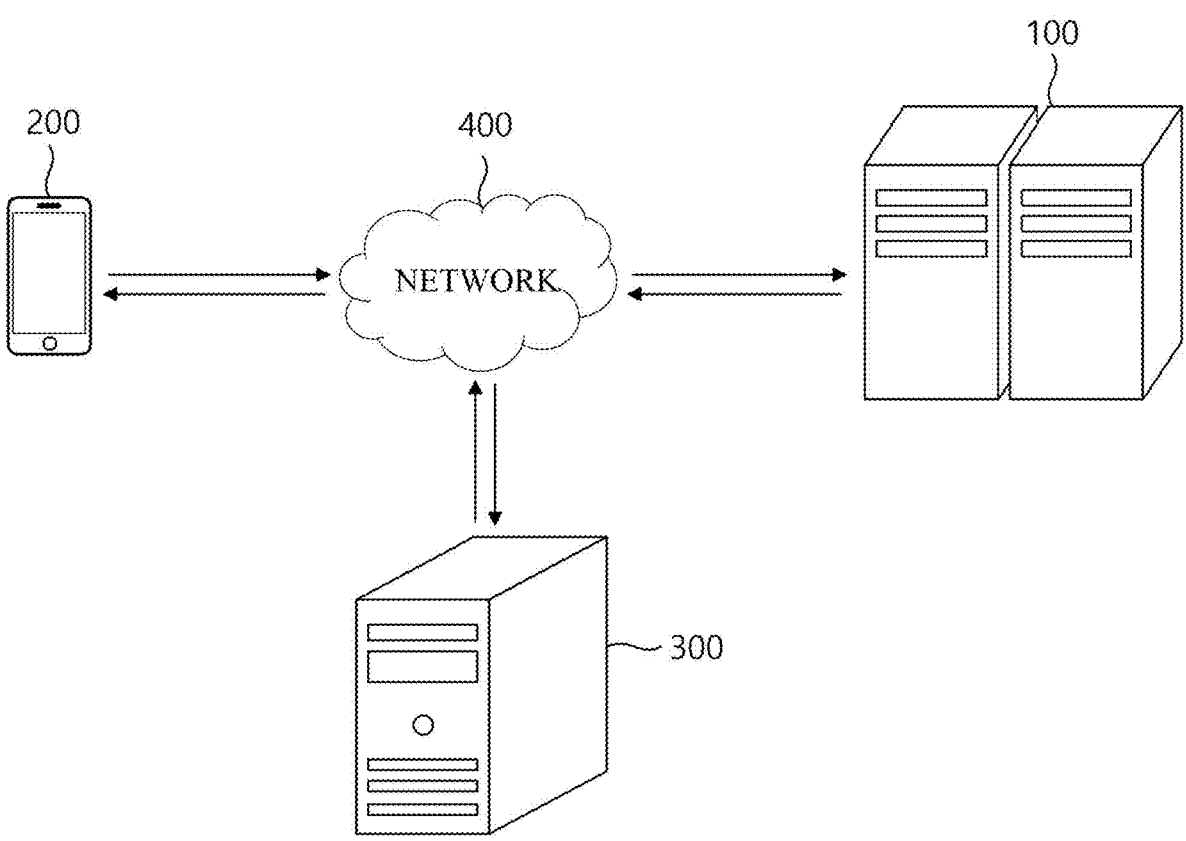
FIG. 1 is a diagram illustrating a system for generating and providing a data video for generating training data of an artificial intelligence model according to an embodiment of the present invention.

Various advantages and features of the present invention and methods accomplishing them will become apparent from the following description of embodiments with reference to the accompanying drawings. However, the present invention is not limited to embodiments to be described below, but may be implemented in various different forms, these embodiments will be provided only in order to make the present invention complete and allow those skilled in the art to completely recognize the scope of the present invention, and the present invention will be defined by the scope of the claims.

Terms used in the present specification are for explaining embodiments rather than limiting the present invention. Unless otherwise stated, a singular form includes a plural form in the present specification. "Comprise" and/or "comprising" used in the present invention indicate(s) the presence of stated components but do(es) not exclude the presence or addition of one or more other components. Like reference numerals refer to like components throughout the specification and "and/or" includes each of the components described and includes all combinations thereof. Although "first," "second," and the like are used to describe various components, it goes without saying that these components are not limited by these terms. These terms are used only to distinguish one component from other components. Therefore, it goes without saying that a first component described below may be a second component within the technical scope of the present invention.

Unless defined otherwise, all terms (including technical and scientific terms) used in the present specification have the same meanings commonly understood by those skilled in the art to which the present invention pertains. In addition, terms defined in a commonly used dictionary are not ideally or excessively interpreted unless explicitly defined otherwise.

Further, the term "unit" or "module" used herein means software or a hardware component such as a field-programmable gate array (FPGA) or an application-specific integrated circuit (ASIC) and performs predetermined functions. However, the term "unit" or "module" is not meant to be limited to software or hardware. A "unit" or "module" may be stored in a storage medium that can be addressed or may be configured to regenerate one or more processors. Accordingly, for example, a "unit" or "module" includes components such as software components, object-oriented software components, class components, and task components, processors, functions, attributes, procedures, subroutines, segments of a program code, drivers, firmware, a microcode, a circuit, data, a database, data structures, tables, arrays, and variables. Functions provided in components, "units," or "modules" may be combined into fewer components, "units," or "modules" or further separated into additional components, "units," or "modules."

Spatially relative terms "below," "beneath," "lower," "above," "upper," and the like may be used to easily describe the correlation between one component and other components as illustrated in drawings. The spatially relative terms should be understood as terms including different directions of components during use or operation in addition to the directions illustrated in the drawings. For example, in a case in which a component illustrated in the drawings is turned over, a component described as "below" or "beneath" the other component may be placed "above" the other component. Therefore, the illustrative term "below" may include both downward and upward directions. The components can also be aligned in different directions, and therefore the spatially relative terms can be interpreted according to the alignment.

In this specification, the computer is any kind of hardware device including at least one processor, and may be understood as including a software configuration which is operated in the corresponding hardware device according to the embodiment. For example, the computer may be understood to be any of a smartphone, a tablet PC, a desktop, a notebook, and a user client or application running on any of these devices, but is not limited thereto.

Hereinafter, embodiments of the present invention will be described in detail with reference to the accompanying drawings.

Each step described in the present specification is described as being performed by a computer, but subjects of each step are not limited thereto, and according to embodiments, at least some steps can also be performed on different devices.

FIG. 1 is a diagram illustrating a system for generating and providing a data video for generating training data of an artificial intelligence model according to an embodiment of the present invention.

Referring to FIG. 1, the system for generating and providing a data video for generating training data of an artificial intelligence model according to the embodiment of the present invention includes an apparatus 100 for generating and providing a data video, a user terminal 200, an external server 300, and a network 400.

Here, the system for generating and providing a data video for generating training data of an artificial intelligence model illustrated in FIG. 1 is provided according to the embodiment, and components of the autonomous driving system are not limited to the embodiment illustrated in FIG. 1 but may be added, changed, or removed as necessary.

In an embodiment, the apparatus 100 for generating and providing a data video may generate data video, and may provide a labeling tool capable of performing a labeling method on data video to generate training data of an artificial intelligence model to assist a user with performing a labeling operation more easily and quickly through a labeling tool.

In various embodiments, the apparatus 100 for generating and providing a data video may be connected to the user terminal 200 through the network 400, and provide a user interface (UI) (e.g., 10 in FIGS. 6 and 7) for providing a method of generating and providing a data video for generating training data of an artificial intelligence model to the user terminal 200, and a user may perform a labeling operation on a specific object through the UI 10. Here, the labeling tool provided by the apparatus 100 for generating and providing a data video may be implemented in a web or application form and provided to a user, but is not limited thereto.

Here, the user terminal 200 includes an operating system for driving a labeling tool in the form of the web or an application provided by the apparatus 100 for generating and providing a data video, and includes a display in at least a partial area for outputting the UI 10. For example, the user terminal 200 is a wireless communication device that ensures portability and mobility, and examples may include any of handheld-based wireless communication devices such as a navigation device, a personal communication system (PCS), Global System for Mobile Communications (GSM), a personal digital cellular (PDC) phone, a personal handyphone system (PHS), a personal digital assistant (PDA), International Mobile Telecommunications (IMT)-2000, Code Division Multiple Access (CDMA)-2000, W-Code Division Multiple Access (W-CDMA), a wireless broadband Internet (WiBro) terminal, a smartphone, a smart pad, and a tablet personal computer (PC), but are not limited thereto.

In addition, here, the network 400 may be a connection structure capable of exchanging information between respective nodes such as a plurality of terminals and servers. For example, the network 400 may include a local area network (LAN), a wide area network (WAN), the Internet (World Wide Web (WWW)), a wired/wireless data communication network, a telephone network, a wired/wireless television communication network, or the like.

In addition, examples of the wireless data communication network may include 3G, 4G, 5G, $3^{rd}$ Generation Partnership Project (3GPP), $5^{th}$ Generation Partnership Project (5GPP), Long Term Evolution (LTE), World Interoperability for Microwave Access (WiMAX), Wi-Fi, Internet, a LAN, a wireless LAN (WLAN), a WAN, a personal area network (PAN), radio frequency, a Bluetooth network, a near-field communication (NFC) network, a satellite broadcast network, an analog broadcast network, a digital multimedia broadcasting (DMB) network, and the like, but are not limited thereto.

In various embodiments, the apparatus 100 for generating and providing a data video may use a plurality of pieces of LiDAR point cloud data to generate a plurality of LiDAR images, couple the plurality of LiDAR images to generate a LiDAR video, and sequentially provide the plurality of LiDAR images included in the generated LiDAR video to a user but selectively update and provide only the changed area of the LiDAR image according to a user's request to more quickly provide the LiDAR image to the user.

In addition, when a specific object is labeled through any one of a plurality of LiDAR images included in a LiDAR video, the apparatus 100 for generating and providing a data video performs the same labeling on a specific object included in the plurality of LiDAR images, so that a user can perform the labeling operation more quickly and conveniently.

In addition, the apparatus 100 for generating and providing a data video may match coordinate values of LiDAR point cloud data for a predetermined area with coordinate values of sensor data (e.g., video data captured by a camera) to calibrate the LiDAR point cloud data and the sensor data. In this way, when a user uses specific LiDAR point cloud data to perform labeling on the generated LiDAR image, the labeling is automatically performed on the corresponding LiDAR image and the calibrated sensor data, so that the user can perform a labeling operation more quickly and conveniently.

In an embodiment, the external server 300 may be connected to the apparatus 100 for generating and providing a data video through the network 400, and the apparatus 100 for generating and providing a data video may store and manage various types of information and data necessary for the apparatus 100 for generating and providing a data video to provide a method of generating and providing a data video for generating training data of an artificial intelligence model or receive, store, and manage various types of information and data generated as a user performs a labeling operation through the UI 10 provided by the apparatus 100 for generating and providing a data video. For example, the external server 300 may be a storage server separately provided outside the apparatus 100 for generating and providing a data video, but is not limited thereto. Hereinafter, a hardware configuration of the apparatus 100 for generating and providing a data video that performs the method of generating and providing a data video for generating training data of an artificial intelligence model will be described with reference to FIG. 2.

Figure 2:
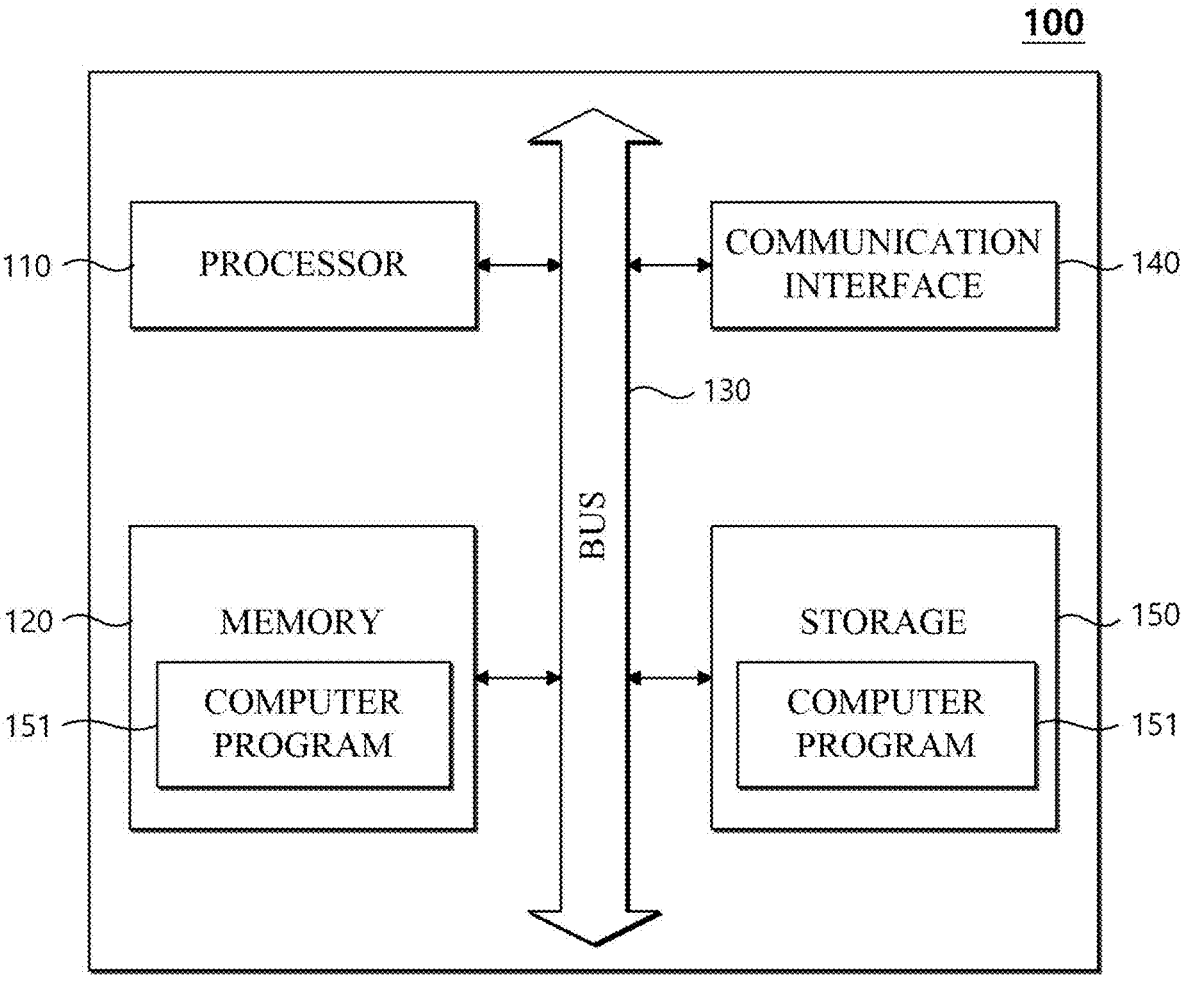
FIG. 2 is a hardware configuration diagram of an apparatus for generating and providing a data video for generating training data of an artificial intelligence model according to another embodiment of the present invention.

FIG. 2 is a hardware configuration diagram of an apparatus for generating and providing a data video for generating training data of an artificial intelligence model according to another embodiment of the present invention.

Referring to FIG. 2, according to another embodiments of the present invention, the apparatus 100 for generating and providing a data video to provide a method of generating and providing a data video for generating training data of an artificial intelligence model (hereinafter, "computing apparatus 100") may include one or more processors 110, a memory 120 into which a computer program 151 executed by the processor 110 is loaded, a bus 130, a communication interface 140, and a storage 150 for storing the computer program 151. However, only the components related to the embodiment of the present invention are illustrated in FIG. 2. Accordingly, those skilled in the art to which the present invention pertains may understand that general-purpose components other than those illustrated in FIG. 2 may be further included.

The processor 110 controls an overall operation of each component of the computing apparatus 100. The processor 110 may include a central processing unit (CPU), a micro processor unit (MPU), a micro controller unit (MCU), a graphics processing unit (GPU), or any type of processor well known in the art of the present invention.

In addition, the processor 110 may perform an operation on at least one application or program for executing the method according to the embodiments of the present invention, and the computing apparatus 100 may include one or more processors.

According to various embodiments, the processor 110 may further include a random access memory (RAM) (not illustrated) and a read-only memory (ROM) for temporarily and/or permanently storing signals (or data) processed in the processor 110. In addition, the processor 110 may be implemented in the form of a system-on-chip (SoC) including at least one of a graphics processing unit, a RAM, and a ROM.

The memory 120 stores various types of data, commands, and/or information. The memory 120 may load the computer program 151 from the storage 150 to execute methods/operations according to various embodiments of the present invention. When the computer program 151 is loaded into the memory 120, the processor 110 may perform the method/operation by executing one or more instructions constituting the computer program 151. The memory 120 may be implemented as a volatile memory such as a RAM, but the technical scope of the present disclosure is not limited thereto.

The bus 130 provides a communication function between the components of the computing apparatus 100. The bus 130 may be implemented as any of various types of buses, such as an address bus, a data bus, and a control bus.

The communication interface 140 supports wired/wireless Internet communication of the computing apparatus 100. In addition, the communication interface 140 may support various communication methods other than the Internet communication. To this end, the communication interface 140 may include a communication module well known in the art of the present invention. In some embodiments, the communication interface 140 may be omitted.

The storage 150 may non-temporarily store the computer program 151. When the computing apparatus 100 performs the process of generating and providing a data video for generating training data of an artificial intelligence model, the storage 150 may store various types of information necessary to provide a process for generating and providing a data video for generating training data of an artificial intelligence model.

The storage 150 may include a nonvolatile memory, such as a ROM, an erasable programmable ROM (EPROM), an electrically erasable programmable ROM (EEPROM), or a flash memory, a hard disk, a removable disk, or any well-known computer-readable recording medium in the art to which the present invention pertains.

The computer program 151 may include one or more instructions to cause the processor 110 to perform methods/operations according to various embodiments of the present invention when loaded into the memory 120. That is, the processor 110 may perform the method/operation according to various embodiments of the present invention by executing the one or more instructions.

In an embodiment, the computer program 151 may include one or more instructions for performing the method of generating and providing a data video for generating training data of an artificial intelligence model that includes generating a plurality of LiDAR images using a plurality of pieces of LiDAR point cloud data for a predetermined area, generating a LiDAR video using each of the generated LiDAR images as a unit frame, and providing a UI outputting the generated LiDAR video.

Operations of the method or algorithm described with reference to the embodiment of the present invention may be directly implemented in hardware, in software modules executed by hardware, or in a combination thereof. The software module may reside in a RAM, a ROM, an EPROM, an EEPROM, a flash memory, a hard disk, a removable disk, a compact disc read-only memory (CD-ROM), or in any form of computer-readable recording medium known in the art to which the invention pertains.

The components of the present invention may be embodied as a program (or application) and stored in a medium for execution in combination with a computer which is hardware. The components of the present invention may be executed in software programming or software elements, and similarly, embodiments may be realized in a programming or scripting language such as C, C++, Java, or an assembler, including various algorithms implemented in a combination of data structures, processes, routines, or other programming constructs. Functional aspects may be implemented in algorithms executed on one or more processors. Hereinafter, the method of generating and providing a data video for generating training data of an artificial intelligence model performed by the computing apparatus 100 and a method of generating training data using the same will be described with reference to FIGS. 3 to 7.

Figure 3:
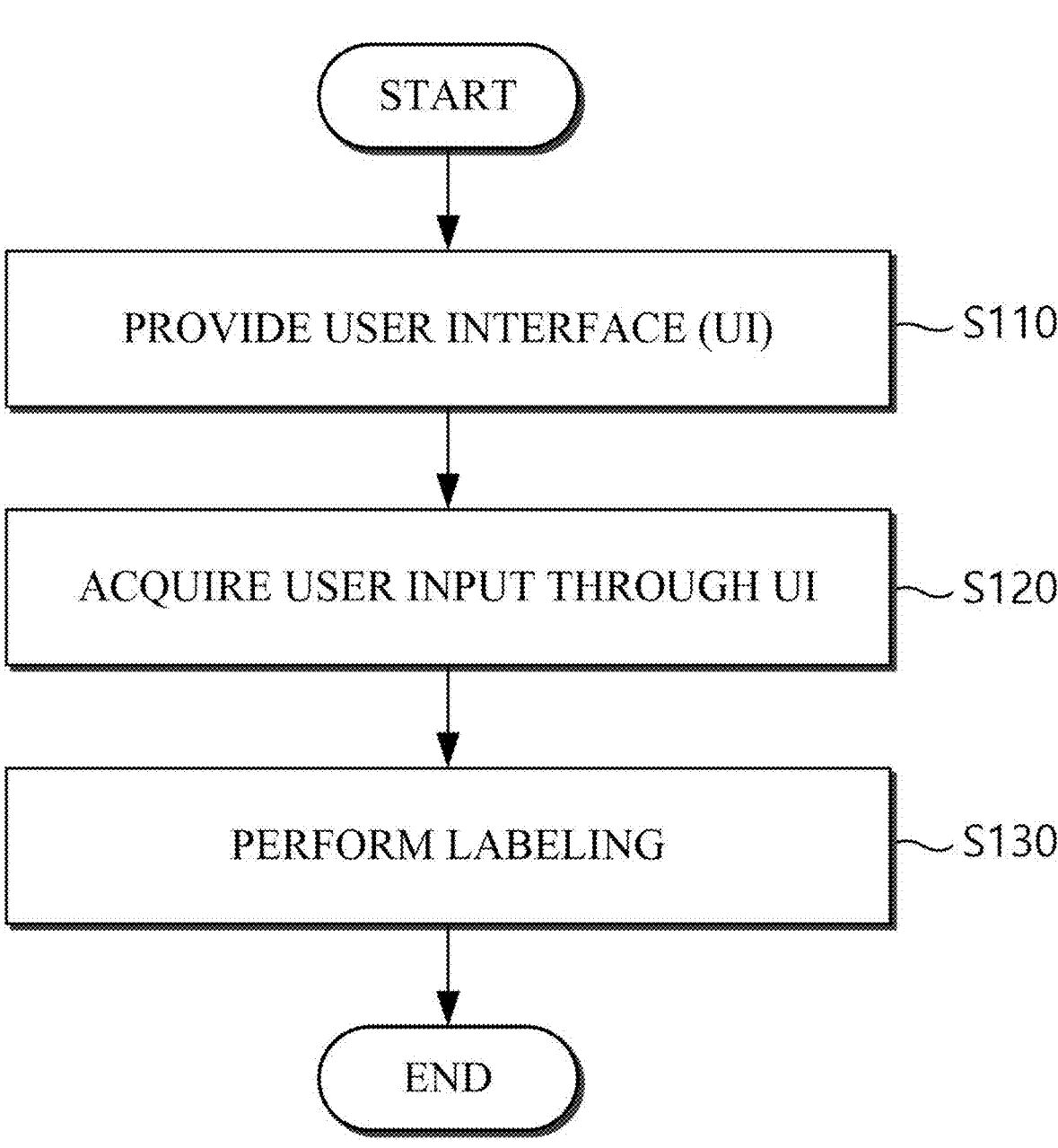
FIG. 3 is a flowchart of a data labeling method for training an artificial intelligence model according to still another embodiment of the present invention.

FIG. 3 is a flowchart of a data labeling method for training an artificial intelligence model according to still another embodiment of the present invention. Referring to FIG. 3, in operation S110, the computing apparatus 100 may provide the UI 10 (e.g., a labeling tool). For example, the computing apparatus 100 may be connected to the user terminal 200 through the network 400 and may provide the UI 10 in response to a user executing a labeling tool through the user terminal 200.

In various embodiments, the computing apparatus 100 may provide a LiDAR video for a labeling operation through the UI 10. Hereinafter, a process of generating a LiDAR video will be described in detail with reference to FIG. 4.

Figure 4:
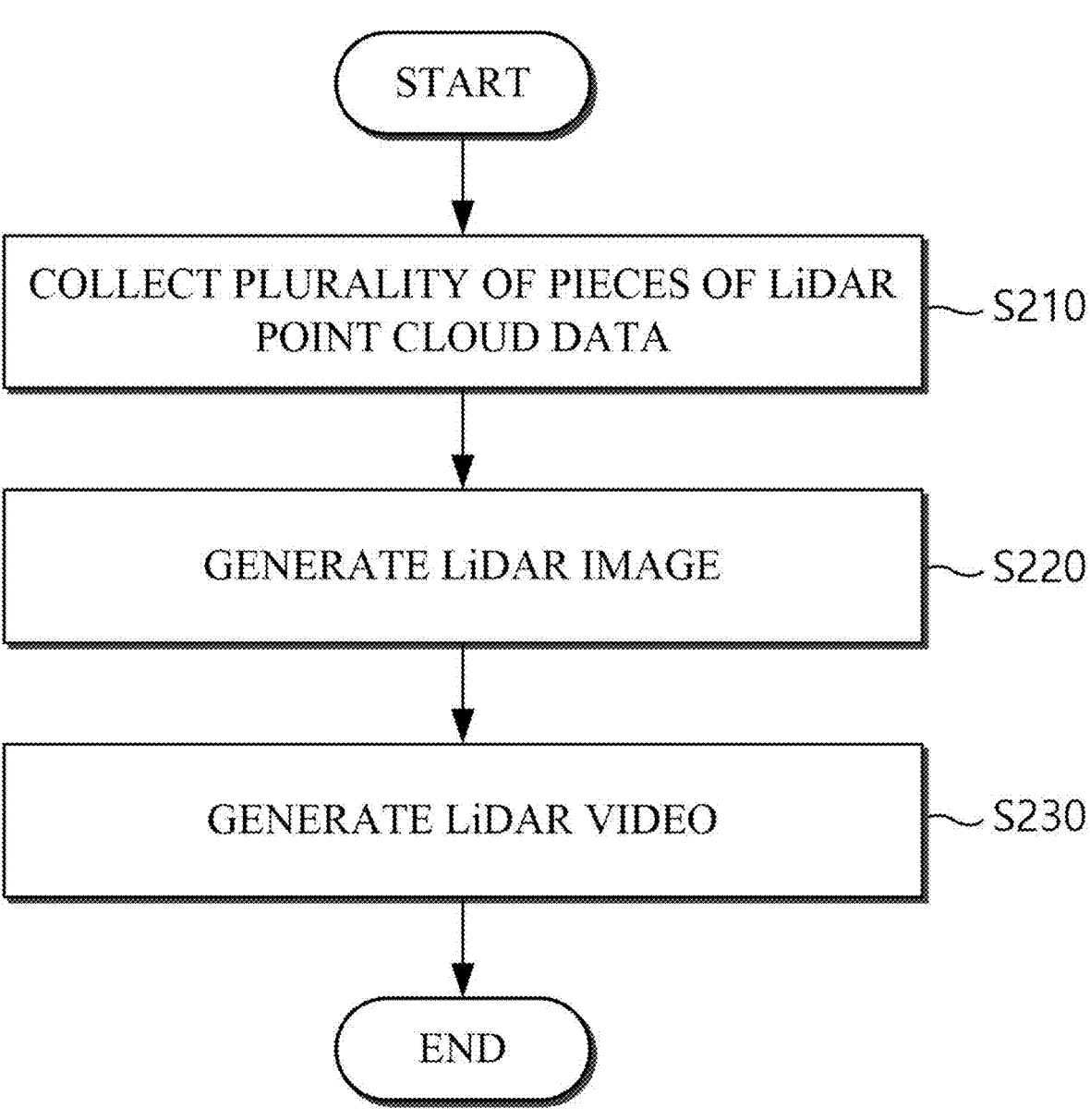
FIG. 4 is a flowchart of a method of generating and providing a data video for generating training data of an artificial intelligence model according to yet another embodiment of the present invention.

FIG. 4 is a flowchart of a method of generating and providing a data video for generating training data of an artificial intelligence model according to yet another embodiment of the present invention.

Referring to FIG. 4, in operation S210, the computing apparatus 100 may collect a plurality of pieces of LiDAR point cloud data for a predetermined area. For example, the computing apparatus 100 may be connected to one or more vehicles (e.g., autonomous driving vehicles) driving in a predetermined area through the network 400, and receive a plurality of pieces of LiDAR point cloud data collected through a LiDAR sensor included in the vehicles.

In various embodiments, the computing apparatus 100 may output a control command for collecting LiDAR point cloud data at a predetermined cycle, and may receive LiDAR point cloud data collected from one or more vehicles according to the control command.

In operation S210, the computing apparatus 100 may generate a plurality of LiDAR images by imaging each of the plurality of pieces of LiDAR point cloud data collected in operation S210.

In various embodiments, the computing apparatus 100 may convert each of a plurality of pieces of 3D LiDAR point cloud data into a 2D LiDAR image. For example, the computing apparatus 100 may generate a 2D type LiDAR image including a plurality of pixels by quantizing each of a plurality of pieces of 3D LiDAR point cloud data on a 2D grid map. However, the method of generating the LiDAR image by the computing apparatus 100 is not limited thereto, and the computing apparatus 100 may apply various methods of generating a LiDAR image, such as generating a plurality of LiDAR images by projecting each of the plurality of pieces of LiDAR point cloud data onto an X-Y plane in a bird's-eye-view (BEV) form.

In various embodiments, the computing apparatus 100 may determine attributes (e.g., brightness, color, contrast, etc.) of each of a plurality of pixels based on point values (e.g., height value) included in each of the plurality of pixels.

In this case, when a plurality of points are included in any one of the plurality of pixels, the computing apparatus 100 may use a representative value (e.g., at least one of an average value, a maximum value, and a density value) of a plurality of points to determine an attribute for any one pixel. That is, in the case of a pixel including a plurality of points, the computing apparatus 100 does not display all points, but display the points in a simplified form even if there is some information loss to simplify the LiDAR image, so that the LiDAR images can be loaded more quickly.

In various embodiments, the computing apparatus 100 may calibrate coordinates of the LiDAR image and coordinates of the sensor data in order to perform the same labeling operation on the sensor data as the labeling operation is performed on the LiDAR image. Here, calibrating the coordinates of the LiDAR image and the coordinates of the sensor data may mean matching and storing the coordinates of the sensor data and the coordinates of the LiDAR image pointing to the same object, but is not limited thereto.

First, the computing apparatus 100 may collect a plurality of pieces of sensor data (e.g., laser scan data collected through a laser sensor, video data collected through a camera sensor, etc.) together at each point in time when each of the plurality of pieces of LiDAR point cloud data is collected.

Thereafter, the computing apparatus 100 may select one or more pieces of sensor data collected at the same time as the point in time when the specific LiDAR point cloud data is collected from the plurality of sensor data, and may calibrate the coordinate values of the selected sensor data and the coordinate values of the specific LiDAR point cloud data.

Also, when using the specific LiDAR point cloud data to generate the specific LiDAR image, the computing apparatus 100 may calibrate the coordinate values of the specific LiDAR image and the coordinate values of the specific LiDAR point cloud data.

That is, the computing apparatus 100 may match the coordinate values of the sensor data and the coordinate values of the LiDAR point cloud data and match the coordinate values of the LiDAR point cloud data and the coordinate values of the LiDAR image to build a relationship of "coordinate values of LiDAR image-coordinate values of LiDAR point cloud data-coordinate values of one or more video data," and use the relationship to extract the coordinate values of the point cloud data and one or more pieces of video data based on the coordinate values of the LiDAR image, extract the coordinate values of the LiDAR image and one or more pieces of video data based on the coordinate values of the LiDAR point cloud data, or extract the coordinate values of the LiDAR image and the LiDAR point cloud based on the coordinate values of one or more pieces of video data.

In operation S230, the computing apparatus 100 may generate a LiDAR video by coupling a plurality of LiDAR images generated through operation S220.

In various embodiments, the computing apparatus 100 may set each of the plurality of LiDAR images as a unit frame, and may sequentially couple a plurality of unit frames according to a time series based on the time when the LiDAR point cloud data corresponding to each of the plurality of unit frames is collected to generate one LiDAR video.

In various embodiments, the computing apparatus 100 may calculate a similarity between adjacent LiDAR images for each of the plurality of LiDAR images for the purpose of reducing the capacity of the LiDAR video, and integrate two or more unit frames having the calculated similarity greater than or equal to a predetermined reference value (e.g., 95%) into one unit frame. For example, when a similarity between a first unit frame and a second unit frame that are adjacent to each other among the plurality of unit frames is greater than or equal to a preset reference value, the computing apparatus 100 may delete any one of the first unit frame and the second unit frame within the LiDAR video. However, the present invention is not limited thereto.

In various embodiments, the computing apparatus 100 may generate a LiDAR image by automatically performing operation S220 in response to collecting various pieces of data (e.g., LiDAR point cloud data and sensor data) for a predetermined area, and temporarily store the generated LiDAR image in a separate storage space. Thereafter, the computing apparatus 100 may generate a single LiDAR video by coupling a plurality of temporarily stored LiDAR images according to time series in response to a user executing a labeling tool or acquiring a LiDAR video provision request from the user, and provide the generated single LiDAR video to the user.

Figure 6:
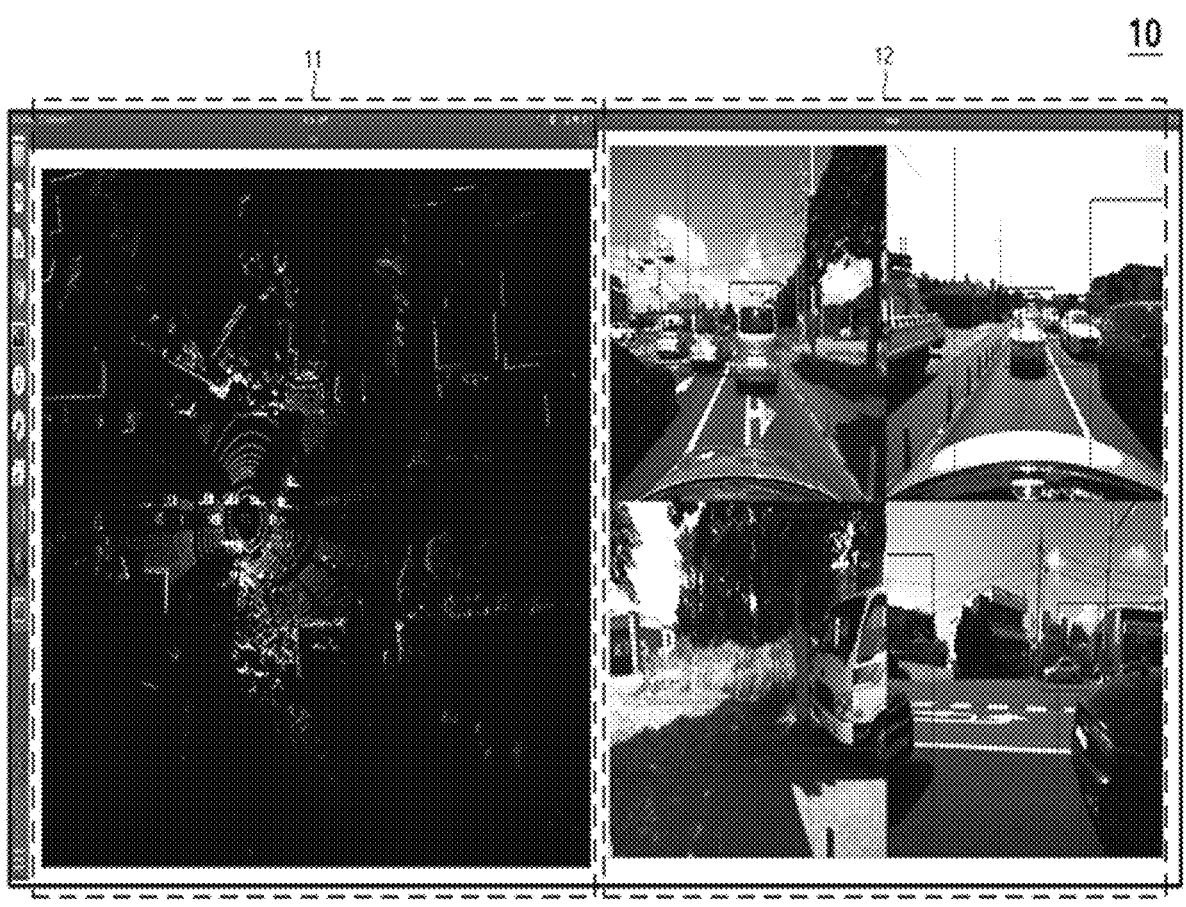
FIGS. 6 and 7 are diagrams illustrating a user interface (UI) provided by an apparatus for generating and providing a data video for generating training data of an artificial intelligence model in various embodiments.
Figure 7:
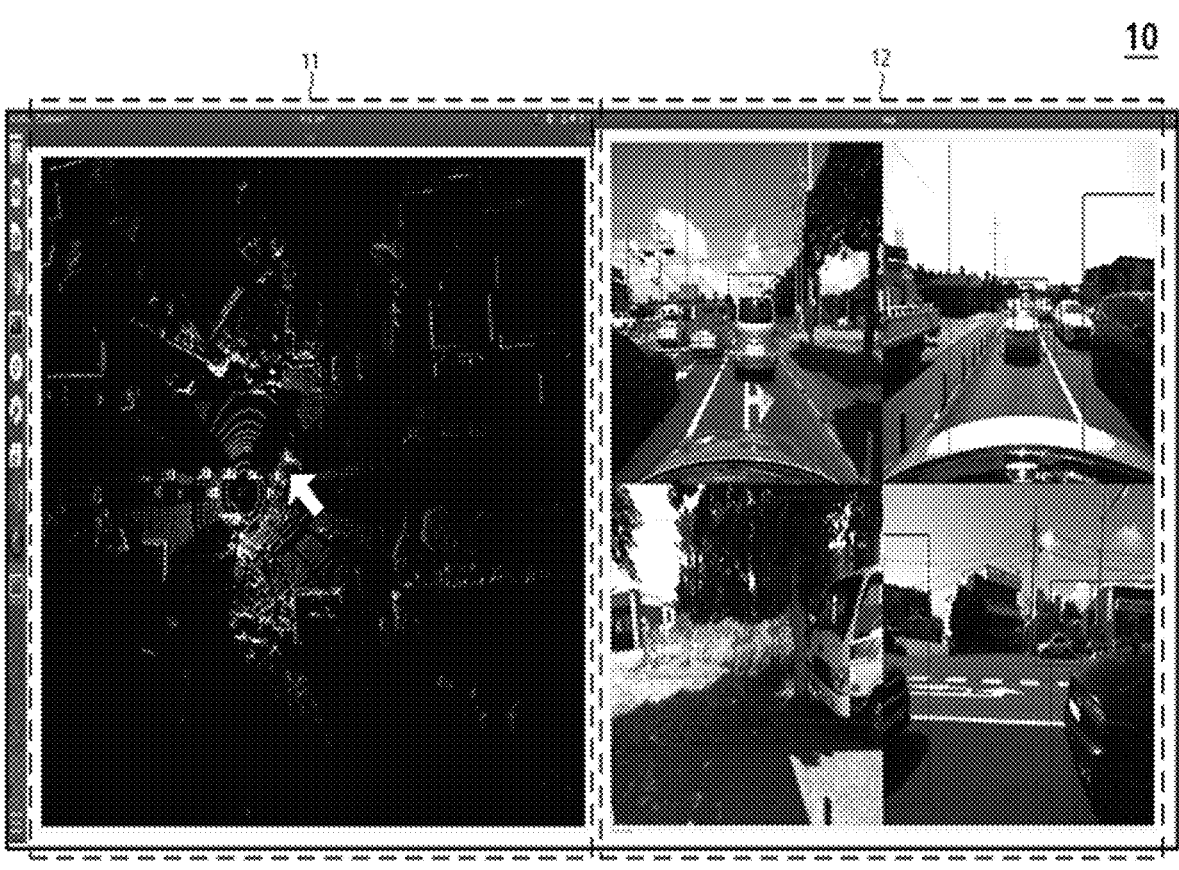

Referring back to FIG. 3, in various embodiments, the computing apparatus 100 may provide the LiDAR video for the labeling operation through the UI 10. For example, the computing apparatus 100 may output the LiDAR video generated according to the above method to a first area 11 of the UI 10 as illustrated in FIGS. 6 and 7.

In addition, as the labeling operation is performed on the LiDAR image corresponding to a specific unit frame, the computing apparatus 100 may simultaneously perform the labeling operation on the sensor data pre-matching the LiDAR image, and output sensor data pre-matching the LiDAR image output in the first area 11 to the second area 12 of the UI 10 in order to provide a user with a result of performing the labeling operation on the sensor data.

In various embodiments, the computing apparatus 100 may sequentially play a plurality of unit frames in response to receiving a LiDAR video playback request from a user.

In addition, the computing apparatus 100 may output a LiDAR image corresponding to any one of a plurality of unit frames to the first area 11 of the UI 10, and output the previous LiDAR image of the currently output LiDAR image or output the next LiDAR image in response to acquiring a user input requesting a unit frame change (e.g., a shortcut key requesting provision of a previous unit frame or a next unit frame) from a user.

In this case, the computing apparatus 100 may sequentially output a plurality of unit frames included in the LiDAR video according to a time series and compare the LiDAR images corresponding to each of the plurality of unit frames to selectively update only the changed pixel area, thereby loading consecutive LiDAR images more quickly and providing the LiDAR images to a user more quickly.

More specifically, when the computing apparatus 100 receives a request from a user to change to the second unit frame as the next unit frame in a state in which the LiDAR image corresponding to the first unit frame is being output through the first area 11 of the UI 10, the computing apparatus 10 may compare a plurality of pixels of the LiDAR image corresponding to the first unit frame currently being output with a plurality of pixels of the LiDAR image corresponding to the second unit frame to detect a pixel (non-identical pixel) whose attribute changes.

Thereafter, the computing apparatus 100 may update only pixels (pixels whose attributes change) detected from a plurality of pixels of the LiDAR image corresponding to the first unit frame to pixels of the LiDAR image corresponding to the second unit frame. Also, when the computing apparatus 100 receives a request from a user to change the first unit frame updated based on the second unit frame to a third unit frame after the second unit frame, the computing apparatus 100 may compare the plurality of pixels included in the updated first unit frame with the plurality of pixels included in the third unit frame as described above, and update only the changed pixels to the pixels of the third unit frame. In this way, unit frames can change and be provided to a user more quickly.

In operation S120, the computing apparatus 100 may acquire a user input for selecting a labeling target through the UI 10 provided to the user through operation S110.

Here, the user input may be an input for selecting an object (e.g., a labeling target) on which a user performs labeling, for example, a mouse pointer click input using a mouse or a touch input through a touch panel, but is not limited thereto.

In addition, here, the labeling target may be any type of vehicle (e.g. a light car, motorcycle, compact car, midsize car, truck, bus, etc.) driving on a road, a person, or a fixed obstacle such as a construction site, guardrail, sign, etc., but is not limited thereto. As described above, the type of labeling targets may be acquired based on a user input, or may be determined based on at least a part of a shape and size of a first bounding box and data included in the first bounding box. When the information on the type of labeling targets is pre-stored, the computing apparatus 100 may acquire the information on the 3D shape and size of the corresponding labeling target. According to an embodiment, the computing apparatus 100 may estimate the 3D shape and size of the corresponding labeling target at a predetermined rate based on the size of the first bounding box even in the case of a labeling target whose type is not stored.

In operation S130, the computing apparatus 100 may perform the labeling on the labeling target in the LiDAR video based on the user input that is input from the user through operation S120. Here, performing the labeling on the labeling target may mean designating the location of the labeling target included in the LiDAR video (or a specific LiDAR image included in the LiDAR video), and matching and recording various types of information (e.g., type, size, attribute, etc.) on the labeling target at the designated location, but is not limited thereto.

In various embodiments, upon acquiring the user input for selecting a specific object through any one of a plurality of unit frames included in the LiDAR video, the computing apparatus 100 may perform a labeling operation on a specific object on a LiDAR image corresponding to any one unit frame, select a unit frame including the same object as a specific object from a plurality of unit frames, and automatically perform the labeling on the specific object on the LiDAR image corresponding to the selected unit frame. Hereinafter, a description will be provided with reference to FIG. 5.

Figure 5:
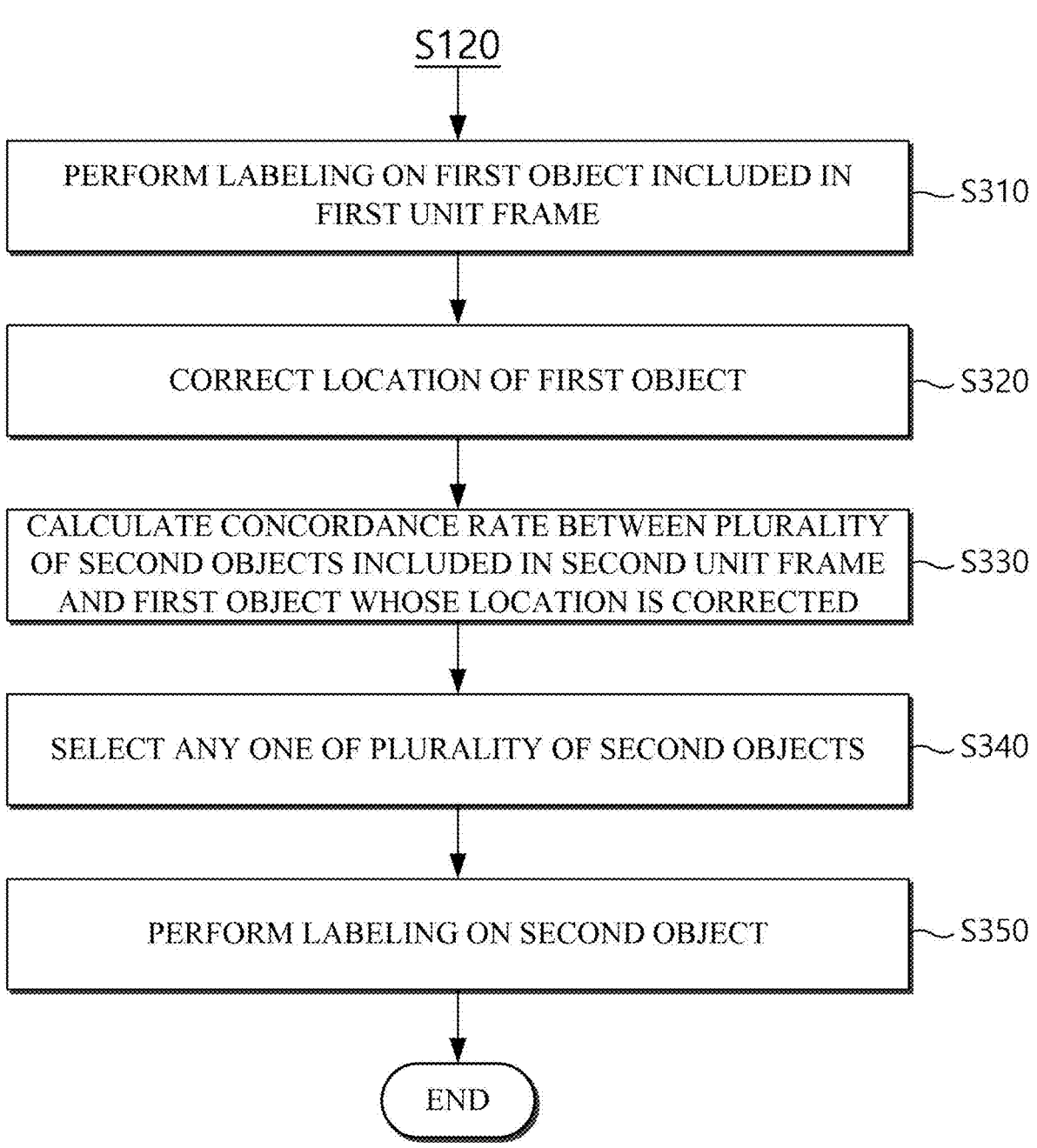
FIG. 5 is a flowchart of a method of performing labeling on the same object included in a plurality of unit frames in various embodiments.

FIG. 5 is a flowchart of a method of performing labeling on the same object included in a plurality of unit frames in various embodiments.

Referring to FIG. 5, in operation S310, the computing apparatus 100 may perform the labeling on the first object in the first LiDAR image corresponding to the first unit frame in response to acquiring the user input for selecting the first object included in the first unit frame (e.g., a LiDAR image generated using LiDAR point cloud data collected at a first point in time) from a user.

In operation S320, the computing apparatus 100 may correct the location of the first object based on the second point in time. For example, the computing apparatus 100 may use location data (GPS data) to estimate an ego motion of the first object, and use the estimated ego motion to correct the location of the first object at the second point in time. Here, various techniques for a method of estimating an ego motion of a specific object are known, and since these known techniques may be selectively applied, a specific method of estimating an ego motion of a first object will not be described in this specification.

In operation S330, the computing apparatus 100 may calculate a concordance rate between a plurality of second objects included in the second unit frame (e.g., a LiDAR image generated using LiDAR point cloud data collected at a second point in time) after the first unit frame, and the first object whose location is corrected through operation S320.

In various embodiments, the computing apparatus 100 may calculate, as a concordance rate, a rate at which an area corresponding to the first object whose location is corrected and an area corresponding to the second object overlap each other, but is not limited thereto, and may apply any method of calculating a similarity between two objects as a concordance rate between two different objects.

In operation S340, the computing apparatus 100 may select any one second object determined to be the same object as the first object from the plurality of second objects based on the concordance rate calculated through operation S330, and perform the labeling on the selected second object. For example, the computing apparatus 100 may select the second object having the highest concordance rate with the first object whose location is corrected from the plurality of second objects, and perform the labeling on the selected second object.

In this case, when the difference in concordance rate between the second object having the highest concordance rate and the second object having the second highest concordance rate is less than or equal to a preset value, that is, when the difference in concordance rate between the second object having the highest concordance rate and the second object having the second highest concordance rate is small, and therefore it is not clear which of the second object having the highest concordance rate and the second object having the second highest concordance rate is the same object as the first object, the computing apparatus 100 may compare the first sensor data (e.g., video data) pre-matched with the first unit frame and the second sensor data (e.g., video data) pre-matched with the second unit frame to select any one of the second object having the highest concordance rate and the second object having the second highest concordance rate as the same object as the first object.

Thereafter, the computing apparatus 100 may select the same object as the first object for the third unit frame after the second unit frame and the fourth unit frame after the third unit frame according to the above method, and perform the labeling on the selected object, thereby performing the labeling on all the unit frames included in the LiDAR video with only one specific object selection operation.

In addition, when the concordance rate of the second object having the highest concordance rate among the plurality of second objects is less than or equal to a preset reference value, the computing apparatus 100 may determine that there is no same object as the first object among the plurality of second objects, and when it is determined that there is no same object as the first object, the computing apparatus may move to the next unit frame to perform the above operations S320 to S350.

Referring back to FIG. 3, in various embodiments, upon acquiring the user input for selecting the first object through the first LiDAR image, the computing apparatus 100 may perform the labeling on the first object, and use the performance content of the labeling on the first object to perform the labeling on the sensor data pre-matched with the first LiDAR image.

First, upon acquiring the user input for selecting the labeling target through a first LiDAR image corresponding to any one of a plurality of unit frames, the computing apparatus 100 may generate the first bounding box for specifying and labeling the labeling target at a location where the user input is acquired on the first LiDAR image.

Thereafter, the computing apparatus 100 may use the first bounding box to generate a second bounding box on sensor data pre-matched with any one unit frame. For example, the computing apparatus 100 may use the coordinate values of the first LiDAR point cloud data pre-matched with the coordinate values of the first LiDAR image of the first object (or the first bounding box corresponding to the first object) to perform the labeling of the first object on the first LiDAR point cloud data.

In addition, the computing apparatus 100 may use coordinate values of one or more pieces of first sensor data (e.g., radar scan data and video data) pre-matched with the coordinate values of the first LiDAR image of the object (or a first bounding box corresponding to the first object) to perform the labeling on the first object on one or more pieces of first sensor data.

In various embodiments, when the sensor data is 3D data (e.g. 3D laser scan data), the computing apparatus 100 may use height information on at least one point inside the first bounding box to calculate a bottom surface and a height of the labeling target, and use the calculated floor surface and height of the labeling target to generate a second bounding box in the form of a 3D figure shape at a location corresponding to the coordinate value of the sensor data on the 3D sensor data 30.

For example, when the type of labeling target is a car and the first bounding box has a rectangular shape, the computing apparatus 100 may calculate an average height, a minimum height, and a maximum height of points included inside the rectangular first bounding box, and use the calculated average height, minimum height, and maximum height to calculate the bottom surface and height of the vehicle to be labeled.

Thereafter, the computing apparatus 100 uses the bottom surface and height of the vehicle to be labeled to determine center points (x, y, and z), an angle (yaw), and sizes (length, width, and height), and generate a rectangular parallelepiped second bounding box having the calculated center points, angle, and sizes as characteristics. In addition, the computing apparatus 100 may output the generated rectangular parallelepiped second bounding box at a location corresponding to the coordinate value of the sensor data of the labeling target on the 3D sensor data 30.

In various embodiments, when the sensor data is the 2D data (e.g., video data captured by a camera), the computing apparatus may convert the coordinate values of the second bounding box in the form of the 3D figure generated by the above method (e.g., method of generating a second bounding box when sensor data is 3D data) into an image coordinate system through camera parameters in the form of a matrix, and may generate the second bounding box in the form of the 2D figure converted into an image coordinate system at a location corresponding to the coordinate value of the sensor data on the 2D sensor data.

For example, when the type of labeling target is a car and the first bounding box has a rectangular shape, the computing apparatus 100 may calculate an average height, a minimum height, and a maximum height of points included inside the rectangular first bounding box, and use the calculated average height, minimum height, and maximum height to calculate the bottom surface and height of the vehicle to be labeled.

Thereafter, the computing apparatus 100 may use the bottom surface and height of the vehicle to be labeled to calculate the center points, the angle, and the sizes, and generate the rectangular parallelepiped second bounding box having the calculated center points, angle, and sizes as characteristics.

Thereafter, the computing apparatus 100 may convert vertex coordinates of the rectangular parallelepiped second bounding box into an image coordinate system to generate the rectangular second bounding box, and may output the generated rectangular second bounding box at the location corresponding to the coordinate value of the sensor data of the labeling target in the 2D sensor data. However, the present invention is not limited thereto.

In various embodiments, upon acquiring an attribute change request (e.g., size, location, shape, angle change, etc.) for the first bounding box from the user through the UI 10, the computing apparatus 100 may change the attribute of the first bounding box based on the acquired attribute change request, and automatically change the attribute of the second bounding box according to the changed content of the first bounding box in response to the change in the attribute of the first bounding box. For example, when modification content requesting to change the first bounding box from a rectangle to a square is input through the UI 10, the computing apparatus 100 may change the shape of the first bounding box from a rectangle to a square according to the changed modification content, and change the shape of the second bounding box from a rectangular parallelepiped to a regular hexahedron based on the change in the shape of the first bounding box.

The foregoing method of generating and providing a data video for generating training data of an artificial intelligence model has been described with reference to the flowcharts illustrated in the drawings. For a simple description, the method of generating and providing a data video for generating training data of an artificial intelligence model has been described by showing a series of blocks, but the present invention is not limited to the order of the blocks, and some blocks may be performed in an order different from that shown and performed in the present specification, or may be performed concurrently. In addition, new blocks not described in the present specification and drawings may be added, or some blocks may be deleted or changed.

In addition, in the method of generating and providing a data video for generating training data of an artificial intelligence model according to various embodiments of the present invention, it is described that, when the labeling operation for the specific object is performed through any one of a plurality of LiDAR images included in a LiDAR video, the labeling of the specific object is automatically performed even on the sensor data pre-matched with any one LiDAR image, but the present invention is not limited thereto, and the labeling of the specific object may be directly performed on the sensor data. When the labeling operation is directly performed on the sensor data, the labeling operation for the specific object may be performed on any one LiDAR image matched with the sensor data, and when the labeling operation is performed on any one LiDAR image, the labeling may also be performed on the remaining LiDAR images. Hereinafter, the UI 10 provided by the computing apparatus 100 and a data labeling process for AI model learning through the UI 10 will be described with reference to FIGS. 6 and 7.

FIGS. 6 and 7 are diagrams illustrating the UI provided by the apparatus for generating and providing a data video for generating training data of an artificial intelligence model, in various embodiments.

Referring to FIG. 6, in various embodiments, the computing apparatus 100 provides a LiDAR video generated according to the method of generating and providing a data video for generating training data of an artificial intelligence model, and provides the labeling tool UI 10 that may perform the labeling operation through the LiDAR video.

Here, the UI 10 may include the first area 11 and the second area 12, and the computing apparatus 100 may sequentially output a plurality of unit frames included in the LiDAR video through the first area 11 according to time series, and output the sensor data pre-matched with the unit frame output to the first area 11 through the second area 12. However, the present invention is not limited thereto, and the UI 10 may include only the first area 11, and when the labeling is performed on the LiDAR video output through the first area 11, the labeling is performed on the sensor data pre-matched with the LiDAR video to output the second area 12 in the form of a pop-up window.

In various embodiments, as illustrated in FIG. 7, when a user positions a pointer (e.g., a mouse pointer) for a user input at a point on any one unit frame output through the first area 11 of the UI 10, the computing apparatus 100 may extract a coordinate value of sensor data pre-matched with any one unit frame using coordinate values of a point on any one unit frame, and use the extracted coordinate values to select the point of the sensor data, change the attribute of the point of the selected sensor data (e.g., display a point in red) and output the changed attribute through the second area 12.

That is, when the user positions the mouse pointer on the specific object on the LiDAR image through the UI 10, the computing apparatus 100 displays what the specific object is on the sensor data, thereby identifying the attribute (e.g., types) of the specific object quickly.

In various embodiments, the computing apparatus 100 may generate the first bounding box for labeling the specific object in response to a user inputting a user input for selecting a specific object. For example, the computing apparatus 100 may display a first bounding box template (e.g., red first bounding box) at the location of the user's mouse pointer, and when the user inputs a user input (e.g., a click input) for selecting a specific location, may generate, record, and display the first bounding box (e.g., blue first bounding box) corresponding to the first bounding box template at the specific location.

In addition, the computing apparatus 100 may generate the second bounding box in response to generating the first bounding box to perform the labeling on the sensor data, and may output the performance result of the labeling on the sensor data to the second area 12.

In this case, when the first bounding box generated according to the user input from the user at least partially overlaps the previously generated first bounding box, the computing apparatus 100 may record and maintain a newly generated first bounding box and delete the previously generated first bounding box.

In addition, upon acquiring a deletion request (e.g., clicking of a wheel button of a mouse) for the previously generated first bounding box from a user, the computing apparatus 100 may delete the previously generated first bounding box.

In various embodiments, the computing apparatus 100 may receive setting of the first bounding box template for each of the plurality of labeling objects from a user in advance and assign a first shortcut key to each first bounding box template, and output any one of the preset bounding box templates to the UI 10 in response to receiving the first shortcut key from the user. For example, when the type of labeling targets is cars, the computing apparatus 100 may receive the setting of the first bounding box template in the form of the 2D figure (e.g., rectangular shape) having a predetermined size according to the size and shape (e.g., sizes and forms of light cars, motorcycles, compact cars, midsize cars, trucks, and buses) of the vehicle from the user, assign a numeric shortcut to each of the set first bounding box templates, and output the first bounding box template corresponding to any one numeric key in response to a user inputting any one of the preset numeric shortcut keys.

In various embodiments, the computing apparatus 100 may output any one template of the plurality of first bounding box templates of different shapes preset according to the user input to the UI 10, and may determine the type of labeling targets according to the shape of any one output template.

In various embodiments, the computing apparatus 100 may change the unit frame output to the first area 11 in response to receiving a preset second shortcut key (e.g., A or D) from the user. For example, the computing apparatus 100 may output the previous unit frame of the currently output unit frame in response to receiving the A key from the user, and may output the next unit frame of the currently output unit frame in response to receiving a D key.

In various embodiments, the computing apparatus 100 may change the size of the first bounding box in response to receiving preset third shortcut keys (e.g., W, S, Z, and X) from the user. For example, the computing apparatus 100 may increase or decrease the length of the first bounding box in response to receiving the W or S key from the user, and may increase or decrease the length of the first bounding box in response to receiving the S or Z key from the user.

In various embodiments, the computing apparatus 100 may change the direction of the first bounding box in response to receiving preset fourth shortcut keys (e.g., U and I) from the user. For example, the computing apparatus 100 may rotate the first bounding box clockwise or counterclockwise in response to receiving the U or I key from the user.

Here, the first to fourth shortcut keys may be values previously set by an administrator of a labeling tool that provides a data labeling method of training an artificial intelligence model, but are not limited thereto, and may be values directly set by the user.

In various embodiments, the computing apparatus 100 may provide any one of a bounding box addition mode for generating the first bounding box through the UI 10 according to the user input (e.g., keyboard input, etc.), a bounding box modification mode for changing the attribute of the previously generated first bounding box, and a region of uninterest (ROU) mode for excluding a specific area from data for training.

In various embodiments, when the UI 10 is in the ROU mode, the computing apparatus 100 may receive setting of an area of an arbitrary size from the user, and may exclude the set area of an arbitrary size from data for training. For example, in a state where the UI 10 is in the ROU mode, the computing apparatus 100 may designate an area of an arbitrary size through a drag operation while the mouse remains clicked, set an area of an arbitrary size through an operation of releasing the mouse click when the area designation is completed, and exclude the input set area from data for training.

According to various embodiments of the present invention, by providing a UI through which a labeling operation is performed, it is possible to perform labeling on a plurality of sensor data by inputting a simple input (e.g., labeling target selection) to 2D-type data output through the UI.

In addition, by generating a LiDAR image and a LiDAR video using a plurality of LiDAR point cloud data and performing labeling on a labeling target through the generated LiDAR images and LiDAR video, it is possible to perform the labeling while quickly watching a video just like when playing the video, and by labeling the LiDAR images back and forth according to time series like the video, it is possible to clearly determine attributes of objects that are difficult to be clearly determined with only one image.

The effects of the present invention are not limited to the above-described effects, and other effects that are not mentioned may be obviously understood by those skilled in the art from the above detailed description.

Although embodiments of the present invention have been described with reference to the accompanying drawings, those skilled in the art will appreciate that various modifications and alterations may be made without departing from the spirit or essential features of the present invention. Therefore, it should be understood that the above-mentioned embodiments are not restrictive but are exemplary in all aspects.

What is claimed is:

1. A method of generating and providing a data video for generating training data of an artificial intelligence model, which is performed by a computing apparatus, the method comprising:

generating a plurality of light detection and ranging (LiDAR) images using a plurality of pieces of LiDAR point cloud data for a predetermined area;

generating a LiDAR video using each of the plurality of generated LiDAR images as a unit frame; and providing a user interface (UI) that outputs the generated LiDAR video, wherein the providing of the UI includes: sequentially outputting a plurality of unit frames included in the generated LiDAR video according to time series; and when a unit frame change request is acquired from a user while a first unit frame is being output, outputting a second unit frame that follows the first unit frame, comparing the first unit frame and the second unit frame to detect at least one pixel whose attribute changes, and updating only the detected at least one pixel in the first unit frame using the second unit frame, wherein the providing of the UI includes performing labeling on a labeling target on the generated LiDAR video in response to acquiring a user input for selecting the labeling target through the generated LiDAR video, and the performing of the labeling includes, when a user input for selecting a specific object is acquired through any one of a plurality of unit frames included in the generated LiDAR video, selecting a unit frame including the same object as the selected specific object from the plurality of unit frames and performing labeling on the specific object in the selected unit frame, and wherein the generating of the plurality of LiDAR images includes matching a coordinate value of first LiDAR point cloud data for the predetermined area with a coordinate value of one or more pieces of sensor data collected at the same point in time as the first LiDAR point cloud data and matching a coordinate value of a first LiDAR image generated using the first LiDAR point cloud data with the coordinate value of the first LiDAR point cloud data, and the performing of the labeling includes, upon acquiring a user input for selecting a first object through the first LiDAR image, performing the labeling on the first object on the first LiDAR image, performing the labeling on the first object on the first LiDAR point cloud data using the coordinate value of the first LiDAR point cloud data matched with the coordinate value of the first LiDAR image of the first object, and performing the labeling on the first object on the one or more pieces of first sensor data using the coordinate value of the one or more pieces of first sensor data matched with the coordinate value of the first LiDAR image.

2. The method of claim 1, wherein the generating of the plurality of LiDAR images includes generating a first LiDAR image by quantizing three-dimensional (3D) first LiDAR point cloud data on a two-dimensional (2D) grid map, the generated first LiDAR image including a plurality of pixels, and attributes of each of the plurality of pixels are determined based on values of points included in each of the plurality of pixels and when a plurality of points are included in one pixel, determining an attribute of the one pixel based on representative values of the plurality of points.

3. The method of claim 1, wherein the generating of the LiDAR video includes generating the LiDAR video by sequentially coupling the generated LiDAR images according to the time series using each of the generated LiDAR images as the unit frame, and when a similarity between a first unit frame and a second unit frame adjacent to each other among the plurality of unit frames included in the generated LiDAR video is greater than or equal to a preset reference value, deleting any one of the first unit frame and the second unit frame within the generated LiDAR video.

4. The method of claim 1, wherein the UI includes a first area that sequentially outputs a plurality of unit frames included in the generated LiDAR video according to the time series and a second area that outputs sensor data pre-matched with any one unit frame output to the first area among the plurality of unit frames, and the providing of the UI includes, when the user positions a pointer for a user input at one point on any one unit frame output to the first area, selecting one point of sensor data pre-matched with the one point on the any one unit frame, changing an attribute of the one point of the selected sensor data, and outputting the changed attribute through the second area.

5. The method of claim 1, wherein the performing of the labeling on the specific object includes:

upon acquiring a request to perform the labeling on a first object included in a first unit frame that is a LiDAR image generated using LiDAR point cloud data collected at a first point in time, performing the labeling on the first object;

correcting a location of the first object based on a second point in time;

calculating a concordance rate between a plurality of second objects included in a second unit frame after the first unit frame and the first object whose location is corrected, the second unit frame being a LiDAR image generated using LiDAR point cloud data collected at the second point in time; and selecting any one second object determined to be the same object as the first object among the plurality of second objects based on the calculated concordance rate, and performing the labeling on the selected second object.

6. The method of claim 5, wherein the performing of the labeling on the selected second object includes selecting a second object having a highest concordance rate with the first object whose location is corrected among the plurality of second objects, performing the labeling on the selected second object, when a difference in a concordance rate between the second object having the highest concordance rate with the first object whose location is corrected and a second object having a second highest concordance rate is less than or equal to a preset value, comparing first sensor data pre-matched with the first unit frame with second sensor data pre-matched with the second unit frame to select any one of the second object having the highest concordance rate with the first object whose location is corrected and the second object having the second highest concordance rate.

7. The method of claim 1, wherein the performing of the labeling includes:

when a user input for selecting the labeling target is acquired through any one of the plurality of unit frames through the UI, generating a first bounding box for labeling the labeling target at a location at which the user input is acquired; and generating a second bounding box on sensor data pre-matched with any one of the unit frames using the generated first bounding box.

8. The method of claim 7, wherein the generating of the second bounding box includes:

when the pre-matched sensor data is 3D data, calculating a bottom surface and a height of the labeling target using height information of at least one point inside the first bounding box, and generating a second bounding box in a form of a 3D figure using the calculated bottom surface and height of the labeling target; and when the pre-matched sensor data is 2D data, converting a coordinate value of the second bounding box in the form of the 3D figure into an image coordinate system to generate a second bounding box in a form of a 2D figure.

9. The method of claim 7, wherein the generating of the second bounding box includes, upon acquiring an attribute change request for the generated first bounding box, changing an attribute of the generated first bounding box based on the acquired attribute change request, and automatically changing an attribute of the generated second bounding box according to the change in the attribute of the generated first bounding box in response to the change in the attribute of the generated first bounding box.

10. The method of claim 7, wherein the generating of the first bounding box includes generating the first bounding box for labeling the specific object in response to acquiring the user input for selecting the specific object, and when the generated first bounding box at least partially overlaps the previously generated first bounding box, maintaining the generated first bounding box and deleting the previously generated first bounding box.

11. The method of claim 7, wherein the generating of the first bounding box includes outputting any one of a plurality of first bounding box templates of different shapes preset according to the user input to the UI and determining a type of the labeling target according to a shape of any one of the output templates.

12. An apparatus for generating and providing a data video for generating training data of an artificial intelligence model, the apparatus comprising:

a processor;

a network interface;

a memory; and a computer program loaded into the memory and executed by the processor, wherein the computer program includes:

an instruction for generating a plurality of light detection and ranging (LiDAR) images using a plurality of LiDAR point cloud data for a predetermined area;

an instruction for generating a LiDAR video using each of the plurality of generated LiDAR images as a unit frame; and an instruction for providing a user interface (UI) that outputs the generated LiDAR video, and the instruction for providing the UI includes an instruction for: sequentially outputting a plurality of unit frames included in the generated LiDAR video according to time series; and when a unit frame change request is acquired from a user while a first unit frame is being output, outputting a second unit frame that follows the first unit frame, an instruction for comparing the first unit frame and the second unit frame to detect at least one pixel whose attribute changes, and an instruction for updating only the detected at least one pixel in the first unit frame to a pixel of the second unit frame, wherein the instruction for providing of the UI includes an instruction for performing labeling on a labeling target on the generated LiDAR video in response to acquiring a user input for selecting the labeling target through the generated LiDAR video, and the instruction for performing of the labeling includes an instruction for, when a user input for selecting a specific object is acquired through any one of a plurality of unit frames included in the generated LiDAR video, selecting a unit frame including the same object as the selected specific object from the plurality of unit frames and performing labeling on the specific object in the selected unit frame, and wherein the instruction for generating of the plurality of LiDAR images includes an instruction for matching a coordinate value of first LiDAR point cloud data for the predetermined area with a coordinate value of one or more pieces of sensor data collected at the same point in time as the first LiDAR point cloud data and matching a coordinate value of a first LiDAR image generated using the first LiDAR point cloud data with the coordinate value of the first LiDAR point cloud data, and the instruction for performing of the labeling further includes an instruction for, upon acquiring a user input for selecting a first object through the first LiDAR image, performing the labeling on the first object on the first LiDAR image, performing the labeling on the first object on the first LiDAR point cloud data using the coordinate value of the first LiDAR point cloud data matched with the coordinate value of the first LiDAR image of the first object, and performing the labeling on the first object on the one or more pieces of first sensor data using the coordinate value of the one or more pieces of first sensor data matched with the coordinate value of the first LiDAR image.

13. A non-transitory recording medium coupled with and readable by a computing apparatus on which program for executing a method of generating and providing a data video for generating training data of an artificial intelligence model is recorded, wherein the method includes:

generating a plurality of light detection and ranging (LiDAR) images using a plurality of pieces of LiDAR point cloud data for a predetermined area;

generating a LiDAR video using each of the plurality of generated LiDAR images as a unit frame; and providing a user interface (UI) that outputs the generated LiDAR video, and the providing of the UI includes: sequentially outputting a plurality of unit frames included in the generated LiDAR video according to time series; and when a unit frame change request is acquired from a user while a first unit frame is being output, outputting a second unit frame that follows the first unit frame, comparing the first unit frame and the second unit frame to detect at least one pixel whose attribute changes, and updating only the detected at least one pixel in the first unit frame to a pixel of the second unit frame, wherein the providing of the UI includes performing labeling on a labeling target on the generated LiDAR video in response to acquiring a user input for selecting the labeling target through the generated LiDAR video, and the performing of the labeling includes, when a user input for selecting a specific object is acquired through any one of a plurality of unit frames included in the generated LiDAR video, selecting a unit frame including the same object as the selected specific object from the plurality of unit frames and performing labeling on the specific object in the selected unit frame, and wherein the generating of the plurality of LiDAR images includes matching a coordinate value of first LiDAR point cloud data for the predetermined area with a coordinate value of one or more pieces of sensor data collected at the same point in time as the first LiDAR point cloud data and matching a coordinate value of a first LiDAR image generated using the first LiDAR point cloud data with the coordinate value of the first LiDAR point cloud data, and the performing of the labeling includes, upon acquiring a user input for selecting a first object through the first LiDAR image, performing the labeling on the first object on the first LiDAR image, performing the labeling on the first object on the first LiDAR point cloud data using the coordinate value of the first LiDAR point cloud data matched with the coordinate value of the first LiDAR image of the first object, and performing the labeling on the first object on the one or more pieces of first sensor data using the coordinate value of the one or more pieces of first sensor data matched with the coordinate value of the first LiDAR image.

* * * * *